Figure 1:
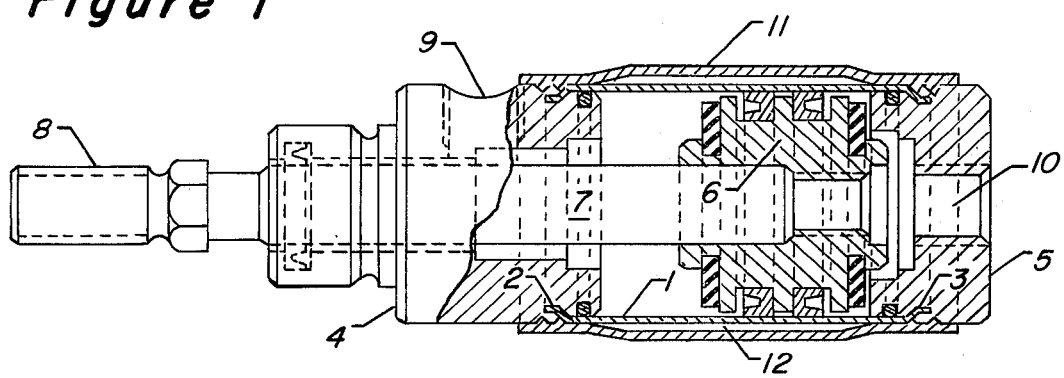

United States Patent [19]

Bimba

[11] 4,073,219
[45] Feb. 14, 1978

[54] FLUID POWER MOTOR WITH GUARD CYLINDER

[76] Inventor: Charles W. Bimba, 101 E. Main St., Monee, Ill. 60449

[21] Appl. No.: 714,796

[22] Filed: Aug. 16, 1976

[51] Int. Cl.² .................... F16J 11/04; F01B 29/00; F01B 31/00
[52] U.S. Cl. ........................ 92/128; 92/164; 92/171
[58] Field of Search .............. 92/171, 128, 164

[56] References Cited

U.S. PATENT DOCUMENTS

| | | | |
|---|---|---|---|
| 3,485,141 | 12/1969 | Ott et al. | 92/171 |
| 3,490,344 | 1/1970 | Archer et al. | 92/171 |
| 3,500,759 | 3/1970 | Potter et al. | 92/171 |

Primary Examiner—Paul E. Maslousky
Attorney, Agent, or Firm—Barry L. Clark

[57] ABSTRACT

An improved fluid power motor construction provides for an encompassing guard tube or cylinder to be spaced around the entire cylindrical body section which accommodates the reciprocating piston member in order to preclude any harmful denting to such body section. The guard cylinder in the present improved constructions is also typically used to serve multiple structural functions, as for example, in one embodiment, it can be used to hold the end portions of the body section tightly to the end cap sections. In a tie rod type of fluid motor constructions, the guard tube will serve as a longitudinal spacer between the end portions of the unit, while with respect to a special repairable form of motor unit the outer guard tube will serve as the tying compression-tension member between the end sections.

1 Claim, 5 Drawing Figures

FLUID POWER MOTOR WITH GUARD CYLINDER

The present invention relates to an improved form of fluid power motor unit which has an encompassing guard tube to prevent external damage to the cylindrical body section of the unit.

In a more specific aspect, the guard tube of this invention is spaced apart from the body cylinder which not only protects such cylinder but, in addition, is used in alternative ways to structurally space and/or hold the end cap sections together. This permits the use of a thin ideal type of material for the body cylinder such that it merely has to serve as a pressure vessel member and a wear surface.

In air cylinders, or fluid power units in general, the tubular body section typically performs three distinct functions, regardless of the body style or construction, as for example: (1) it acts as a vessel to contain the air or liquid pressure; (2) it is a guide for the reciprocating piston member; (3) it is a structural member to either hold the end sections together or to keep them spaced apart. In performing these functions, in addition to the need to provide a smooth, low friction and long wearing internal surface for the piston action, it has been necessary to make certain compromises in the choice of a material for the cylinder section of a unit. For instance, from a pure wearability aspect, it might be of advantage to use a smooth ceramic type of material; however ceramic is typically brittle and would be impracticable for holding the end cap members together. Low carbon steel would be ideal from cost aspects, but can create corrosion problems and piston seal wear, particularly for air cylinders where the compressed air contains water vapor.

Aluminum alloys provide good structural materials for body cylinders and are used for many present day motor units; however, the aluminum alloys must be surface treated, by anodizing, etc., in order to be able to withstand the wear of the reciprocating action of the internal piston. Actually, for compressed air cylinder units, present day constructions are generally using stainless steel, brass, and chrome-plated steel, in addition to the hard-coat aluminum alloy materials; however, from one aspect or another, all of these materials may be considered a compromise, as heretofore indicated.

From a performance aspect, stainless steel readily proves to be the superior material in that it has structural strength, it will not corrode, and it will provide good wearability for the piston action. However, from economic aspects, it is much more expensive than the aforementioned competitive materials and it is necessary to use a much thinner wall tubing to be able to compete in the marketplace. The use of a thin wall stainless steel tubing, which is in the range of 0.030 to 0.040 inch wall thickness, is quite adequate to hold high pressures of the order of up to 2000 psi when properly sealed at its ends into a tight fit with the end caps. Also, this thin tubing can provide good long wear against the internal piston action. On the other hand, a thin stainless steel cylinder, in a typical manufacturing plant environment, can be subject to accidental bumping by material being handled or can be hit by a falling object such that denting can occur which will require that the cylinder be thrown away or taken out of service for repairs.

It is thus a principle object of the present invention to provide an improved construction which retains all the advantages available with the thin steel body cylinder and, in addition, incorporates a spaced encompassing guard tube such that the tubular body section will not be readily dented or otherwise damaged from external forces.

A further object of the present invention is to provide cylinder constructions where the dent preventing guard tube can take over all the functions of a longitudinal structural member to relieve the internal body cylinder of such functions. Thus, the guard tube is a spacer-compression member between tied together end cap members, or alternatively, can serve as a structural tie member and tension member between end cap members in a repairable embodiment of fluid motor unit where there are no tie rods and the outer tube itself may be threaded to the end cap members or otherwise removably attached, as for example by removable "snap-in" rings.

It may be considered a still further object of the present invention to incorporate a guard tube for the cylindrical body section of a fluid power motor unit where the guard is attached in a manner to also serve as a "tie-band" member for more efficiently effecting the holding of the rolled-in end portions of the body cylinder to the two end cap sections. With respect to the reinforcing band or "tie-band" types of construction, reference may be made to the presently issued U.S. Pat. Nos. 3,811,367 and 3,848,325. It is to be noted that in connection with the present guard tube constructions, which will be described hereinafter in more detail, where the ends of the tube are used to reinforce the rolling-in of the ends of the body section that it is not intended to limit the guard tube attachment to any one method or means. For example, the outer tube ends can be rolled-in over the ends of the body cylinder or a tight compression-deformation can be accomplished by a magnetic field action in the manner of the teachings of U.S. Pat. No. 3,848,325 and by the teachings of the earlier U.S. Pat. No. 2,976,907.

In a broad embodiment, the present invention provides in connection with a fluid power motor unit having a housing with a cylindrical body portion and end cap members to enclose and accommodate an internal reciprocating piston, at least one piston rod connecting to the piston and extending through an end cap member, and fluid inlet and outlet means for introducing fluid pressure to at least one side of the piston in said body portion, the improved construction to preclude denting of the cylinder body portion of the unit, which comprises:

a. providing an encompassing separate guard cylinder around said body section and spaced slightly therefrom to effect an air space whereby the inner cylindrical body portion will be protected from accidental denting, and b. means connecting the ends of the guard cylinder to the end cap members of the unit to provide a fixed positioning for such guard cylinder.

Specific embodiments, as heretofore suggested will involve special means for the attachment of the guard cylinder such that it is not only a dent protecting member, but will also serve a dual function capacity as a compression "tie-band" member, or as a spacer, or a longitudinal member in a repairable unit, etc.

It is to be noted that in all of the embodiments, the external guard cylinder is being placed at a small spaced distance from the body cylinder in order to provide a thin annular air space of typically 1/32 inch or more, and which, in turn, will provide for blows and substantial denting and deformation of the outer tube without in any way harming the action of the main body cylinder and the action of the internal piston.

Other advantages and dual or even triple purpose functions will be noted in connection with the following description of the drawing and by specific references to the accompanying drawings.

FIG. 1 of the drawing is a partial sectional view of a fluid power unit which incorporates an external guard tube that is tightly compressed around its ends to encompass and reinforce the joining of the ends of the cylinder body with the opposing end cap members.

Figure 2:
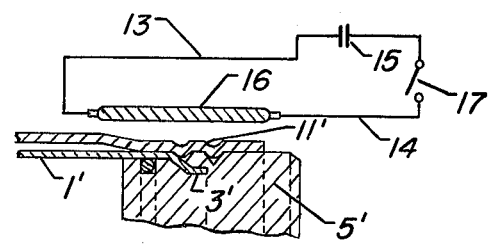

FIG. 2 is a partial sectional view which shows a modification of FIG. 1 in that the ends of guard tube reinforcing the rolled-in ends of the inner body cylinder are tightened by a high energy magnetic pulse.

Figure 3:
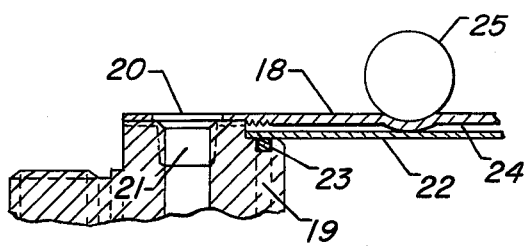

FIG. 3 of the drawing is another partial sectional view of an end of a unit showing how the guard tube is a dent protector and, in addition, that the ends of the guard tube can be threadedly connected to the end caps for their structural attachment and for the assembly of the unit.

Figure 4:
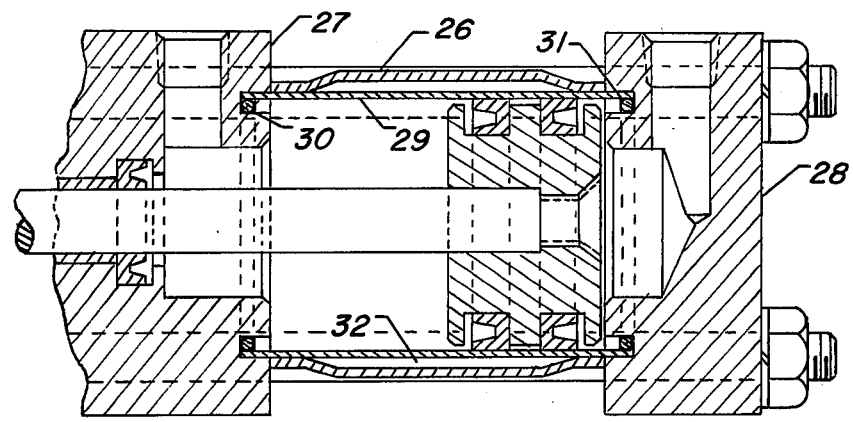

FIG. 4 of the drawing indicates a protected embodiment of a fluid power unit where the end caps are tied by longitudinal tie rods.

Figure 5:
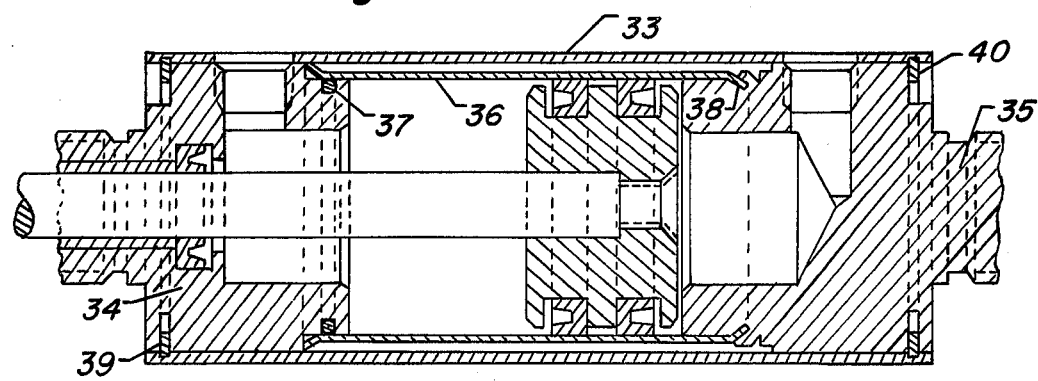

FIG. 5 shows, in a longitudinal sectional view, a modified embodiment of a repairable form of fluid power unit where the outer guard tube also serves as a longitudinal structural member to hold the end caps together.

Referring now particularly to FIG. 1 of the drawing there is indicated a fluid power cylinder embodying a thin wall body portion 1, such as of stainless steel, with rolled-in end sections 2 and 3 making a fixed pressure holding connection to the opposing sections 4 and 5. There is also shown a reciprocating piston member 6 which serves to move the piston rod 7 and whatever form of work piece may be attached to the external end portion 8. A fluid port 9 is shown in the end section 4 and a second port 10 is indicated in the opposite end cap 5 in order to provide for pressurized fluid flow into and out of the interior of the body section 1. In accordance with the present invention, there is further indicated an outer guard cylinder 11 which extends for the full length of the inner body cylinder 1 and is spaced slightly therefrom to, in turn, provide a small annular space 12 as a protection for the inner cylinder 1.

The present embodiment also provides that the two end portions of the outer tube 11 are rolled or otherwise compressed around the rolled-in end portions 2 and 3 for the inner cylinder 1. This insures a tight connection for the two cylinders and a reinforcement for longitudinal end pressures in the manner of the heretofore noted "tie-band" constructions.

The present new and novel use of a guard tube for the fluid power motor unit in turn permits the use of a thin more ideal type of material for the inner body cylinder since it is now protected from dents and can be further reinforced to withstand circumferential and end pressures of the particular fluid to be used in the motor unit. Although stainless steel is generally the preferred material for the inner body cylinder, as here in before set forth, it is to be noted that it is not intended to limit the present invention to any one specific material, or to any one thickness. Where the outer tube is taking longitudinal forces and can in some embodiments reinforce the inner tube, then the latter need only be of sufficient thickness and strength to provide for hoop stress and also make a good seal with the end cap members.

In FIG. 2 of the drawing, there is indicated a special modification having a type of construction and assembly where the ends of the outer guard tube, such as indicated at 11, will be compressed or shrunk around an inner tube end 3' and over the end cap number 5' by a high energy magnetic-field pulse method which will cause the outer metal to actually deform down into any remaining grooves around the tubular body section 1'. This type of clamping or shrinking operation is sometimes referred to commercially as a "magneforming" procedure and also as noted heretofore is described in U.S. Pat. No. 2,976,907. In the diagrammatic part of the drawing, there are indicated cables 13 and 14 from a capacitor 15 to a magnetic coil 16, which will provide the necessary high energy field, and also a switch means 17 such that there is the means to rapidly discharge the high energy magnetic pulse which can effect the desired compression and deformation. Typically, for this type of reinforcing attachment the outer guard tube will be of steel or of aluminum alloy to permit the efficient use of the magnetic pulse compression procedure. Actually, it appears that aluminum tubing which has been previously annealed by heating to about 975° F and followed by water quenching, provides a deformation and better conformation to the underlying surface than will cold drawn steel.

In FIG. 3 of the drawing, there is shown a construction embodiment where the outer dent guard tube 18 is threaded internally and makes a threaded engagement with the outer periphery of an end cap member 19. In this instance, the tightening engagement provides that a hole 20 in the tube 18 can be brought into alignment with the tapped opening 21 for a pipe connection and fluid flow through cap 19 to the interior of the cylinder. A feature of the present construction, and particular advantage, is the disassembly and repairability of this embodiment by virtue of the threaded connection of the outer guard tube with the end caps and the slip fit of the inner body cylinder 22 over internal end cap sections and suitable seal means such as "O" ring 23. As with the other embodiments, the outer cylinder 18 will be spaced slightly from the inner cylinder 22 to provide an air space and an annular dent protection zone 24. Also in this figure, noted the showing of an object 25 having struck against tube 18 so as to cause a dent therein, but still not damage cylinder 22. This space 24 can, of course, be varied to suit the type of material used for guard tube 18 as well as for the nature of the motor unit environment as to the likelihood of severe or minor denting. Piping connected to port 20 will also assist in preventing the loosening of tube 18 from the end cap section.

In FIG. 4 of the drawing, there is shown a tie rod type of motor unit with the modification of an outer guard tube 26 extending between tied together end sections 27 and 28. This embodiment, like that of FIG. 3, is a repairable type of unit and also, in accordance with the present invention, provides for the guard tube to serve as a structural compression member and it will, of course, be made sufficiently strong to contact and hold the end caps apart without buckling. However, the corallary advantage of this modification is obtained in that the inner body cylinder 29, like the system of FIG. 3, can be thin and merely serve to hold vessel pressure and resist the wear of the piston. There is thus no need for the body cylinder to have to compromise its functions and also serve as a longitudinal structural compression and/or tension member. For a pressure seal, the body cylinder 29 is shown sliding over and engaging end seal rings 30 and 31, however, other types of pressure seal means can be used and it is not intended to limit the construction to any one specific arrangement. Also, again, an annular space 32 is provided between the inner and outer cylinders of the unit in order to give the desired dent protection for the inner tube 29.

FIG. 5 of the drawing shows still another form of repairable motor unit which embodies the present invention by having an outer guard tube 33 removably connect with end sections 34 and 35 and also be spaced around an inner relatively thin body cylinder 36. The latter is shown as being a slip fit at one end over "O" ring 37 in a groove of the end section 34 while the other end of cylinder 36 is shown as being rolled into a groove means 38 for end section 35. However, a gasket type of seal means can be made at each end of the body cylinder where so desired, and it is not intended to limit the construction to any one set manner. In this design, deformable "snap-rings" 39 and 40 are used to effect the longitudinal holding of the guard tube 33 with the respective end members 34 and 35. Such rings can be split or otherwise designed to reduce in diameter for permitting the removal of cylinder 33 from each end section; however, suitable grooves are necessarily provided in the respective sections to insure a tight assembly of the unit. Actually, the present embodiment is similar to that of FIG. 3 except that the outer dent guard tube is using a "snap-ring" attachment to the end sections, rather than being thready engaged therewith.

In any event, it is to be noted that it is not intended, or necessary to limit the present improved type of fluid power motor unit to any one specific construction system. There is, however, the particular feature of all designs that the inner cylinder is primarily relieved of the need to serve several structural functions and there is thus no need to compromise a design as to type of material and/or material thickness. In other words, the inner cylinder can be designed only for vessel pressure and piston wear aspects.

Still other design modifications using an external guard tube along with an inner body cylinder will be apparent to those skilled in the design of fluid power motor units, whether for hydraulic service or for use with compressed air.

I claim as my invention:

1. In a fluid power motor unit a thin cylindrical body portion and end cap members to enclose and accommodate an internal reciprocating piston, separate sealing means at each end of the body portion located between the ends of the body portion and the end cap members for completely sealing the ends of said body portion to said end cap members, at least one piston rod connecting to the piston and extending through an end cap member, and fluid inlet and outlet means for introducing fluid pressure to a working chamber on at least one side of the piston in said body portion, the improved construction to preclude denting of the cylindrical body portion of the unit which comprises:

a. providing an encompassing separate guard cylinder around said body portion and spaced slightly therefrom to effect a closed air space which is out of communication with said working chamber, whereby the inner cylindrical body portion will be protected from accidental denting, said cylinder body portion forming slip-fit connections over said sealing means and portions of said end cap members, said outer guard cylinder having its end portions internally threaded to engage with external threading on said end cap members, whereby the motor unit can be disassembled for access to the piston.

* * * * *